United States Patent [19]

Roussel

[11] Patent Number: 4,809,945

[45] Date of Patent: Mar. 7, 1989

[54] SOAP MOLDING APPARATUS

[76] Inventor: Yvon Roussel, 606 - 25 Victoria Street, Hull, Quebec, Canada, J8X 1Z8

[21] Appl. No.: 90,240

[22] Filed: Aug. 25, 1987

[30] Foreign Application Priority Data

Jun. 30, 1987 [CA] Canada .................................. 541051

[51] Int. Cl.$^4$ ................................................ B28B 7/10
[52] U.S. Cl. .................................. 249/136; 425/436 R; 17/32
[58] Field of Search ............... 425/415, 394, 398, 399, 425/406, 410, 412, 416, 419, 441, 444, 436 R, 440, 500, 502, 520, 521; 249/136; 17/32

[56] References Cited

U.S. PATENT DOCUMENTS

| Re. 19,780 | 12/1935 | McKay .................. 425/412 |
| 198,096 | 12/1887 | Folwell ................. 249/136 |
| 619,554 | 2/1889 | Fox ....................... 249/136 |
| 3,094,758 | 6/1963 | Downie et al. ........ 425/394 |
| 3,148,430 | 9/1964 | Hanner .................. 17/32 |
| 4,436,499 | 3/1984 | Ferrighi ................. 17/32 |

FOREIGN PATENT DOCUMENTS

| 760882 | 6/1967 | Canada .................. 18/91 |
| 787304 | 6/1968 | Canada .................. 18/44 |
| 899016 | 5/1972 | Canada .................. 18/45 |
| 2493804 | 5/1982 | France ................... 17/32 |

*Primary Examiner*—Bernard Nozick
*Attorney, Agent, or Firm*—Marjama & Pincelli

[57] ABSTRACT

The specification describes an apparatus which includes a mold cavity for use in molding an article such as a bar of soap. The mold cavity, which includes a bottom wall, side walls and end walls, is provided with means for moving at least one of the walls after the article has been formed in the mold so as to permit easy removal of the article therefrom.

3 Claims, 3 Drawing Sheets

SOAP MOLDING APPARATUS

This invention relates to an apparatus for use in molding articles such as bars of soap and, more particularly, to a mold cavity for molding such articles which has at least one movable wall to permit easy access to the bar of soap after the molding process has been completed.

BACKGROUND OF THE INVENTION

It is known that hand soap as well as soaps for laundry and other cleaning purposes can be prepared in the home using available ingredients. Remnants or broken pieces of used soap bars can be added to the mixture as a means of making efficient use of the last part of a soap bar which is otherwise too small to handle.

The ingredients are supplied in a softened form, or they may be softened, melted or otherwise blended as required to form a pourable and formable substance which may be poured into a mold of desired shape and left to harden or set. Since conventional molds are comprised of a cavity having integrally formed bottom and side wall, it is difficult to remove a hardened bar of soap from the cavity without distorting the shape or otherwise breaking or marking the bar.

SUMMARY OF THE INVENTION

The present invention overcomes the above described problem by providing a mold in which at least one of the walls which form the mold is movable so that after the soap has hardened, the wall is lowered or raised to provide easy access to the bar. This is accomplished by providing, in the broadest form, an apparatus for molding articles such as soap comprising a mold cavity having a bottom wall, a pair of opposed side walls and a pair of opposed end walls, at least one of the walls or a portion thereof being independently adjustable from a first mold cavity completing position to a second position removed from the cavity and spring means urging the wall or portion thereof to the first position.

BRIEF DESCRIPTION OF THE DRAWINGS

The advantages and operation of the invention will be apparent from the following detailed description in conjunction with the appended drawings wherein.

DESCRIPTION OF PREFERRED EMBODIMENT

Figure 1:
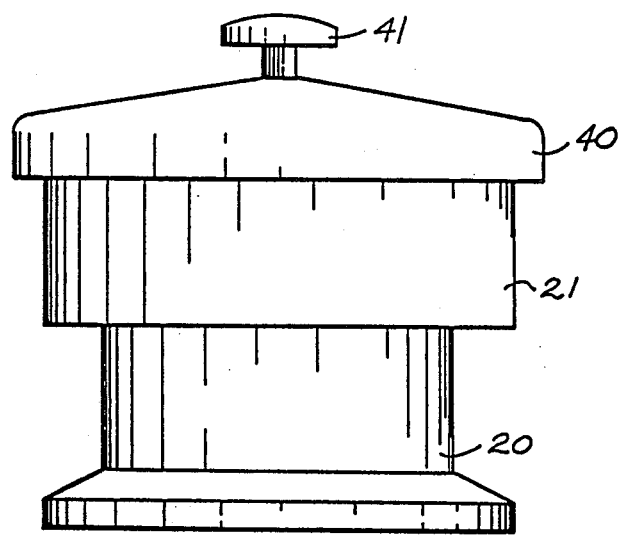
FIG. 1 is a side view of the apparatus of the present invention.
Figure 2:
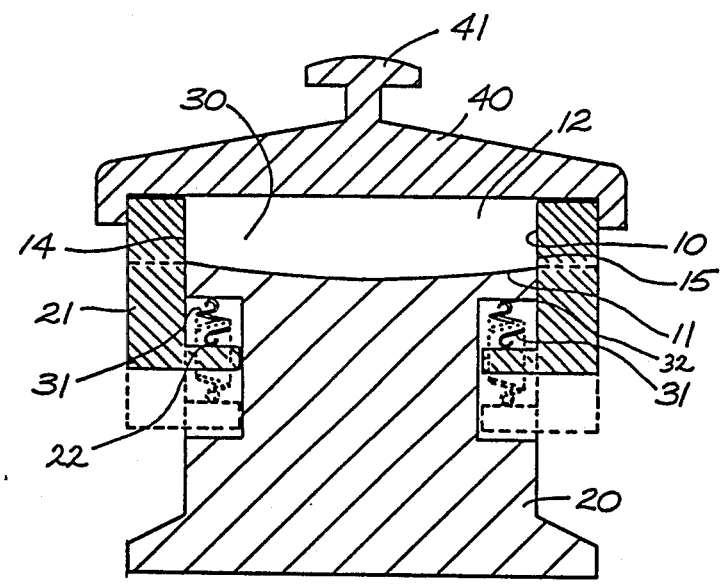
FIG. 2 is a cross-sectional view of one embodiment of the present invention.

Referring, initially to FIG. 1, the apparatus according to a preferred embodiment is illustrated. The mold cavity is shown in FIG. 2 and is illustrated as being substantially rectangular, however, it is to be understood that the cavity could also be formed in other configurations such as square, oval, round etc.

Figure 3:
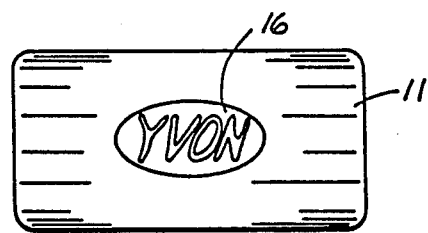
FIG. 3 is an illustration of the mold bottom wall showing a insert for marking the article.

The cavity is made up of a mold bottom wall 11, a pair of opposed side walls 12 and 13 (not shown) and a pair of opposed end walls 14 and 15. In accordance with one feature of the invention and shown in FIG. 3 an insert 16 having embossed therein an individual's name or other desired information may be attached to the bottom wall 11 of the mold 10 such that this information will appear indented in the bar of soap formed in the mold. The strip 16 can be secured in a recessed area in the mold bottom by such means as a suitable adhesive or double sided tape. As an alternative the strip 16 may be attached to a movable post as will be described hereinafter.

In a preferred embodiment, the mold is constructed so that the bottom wall 11 and opposed side walls 12 and 13 are formed integrally with the base member 20. The opposed end walls 14 and 15 are joined or formed as part of a sliding member 21 which is adapted to surround the base member 20. Thus, the sliding member 21, when held in the position shown in the solid line in FIG. 2, locates the end walls 14 and 15 of the mold in a position so as to complete the cavity. When the sliding member 21 is lowered as shown in phantom in FIG. 2, the end walls 14 and 15 of the mold are lowered or removed from the cavity thereby exposing an article in the cavity. Thus, a molded bar of soap 30 can be removed without difficulty.

In an alternaive embodiment which is not shown, but which is analogous to the previously described model, the side walls 12 and 13 are joined to or are part of the sliding member 21, and the end walls 14 and 15 are integral with the bottom wall 11 and the base 20. Thus, an article such as a bar of soap can be removed from the cavity after molding by moving downwardly the sliding member and side walls 12, 13.

Biasing means such as coil springs 31 are positioned between the base member 20 and the sliding member 21. As shown in FIG. 2, this spring is attached to the base 20 at a point 32 adjacent the molding cavity 10 and to the sliding member 21 at the opposite end 22. Thus, the springs 31 urge the sliding member 21 to remain in a position such that the mold cavity is completed. The springs 31 do, however, have sufficient resiliency to permit the sliding member 21 to be lowered to the extent that the end walls or side walls, as the case may be, can be lowered beyond the bottom wall 11 to exposed a bar of soap 30 in the cavity 10.

As a further embodiment, again not specifically illustrated, both the side walls 12 and 13 and the end walls 14 and 15 can be formed as part of the sliding member 21 and only the bottom wall 11 is integrally formed with the base 20. Thus, after the bar of soap 30 has set, the sliding member 21 is lowered thereby exposing all sides of the bar. This configuration has the added advantage that the edge face of the formed bar does not have any mold lines.

Preferably two coil springs are used as shown in FIG. 2 although additional springs may be used if required.

Figure 4:
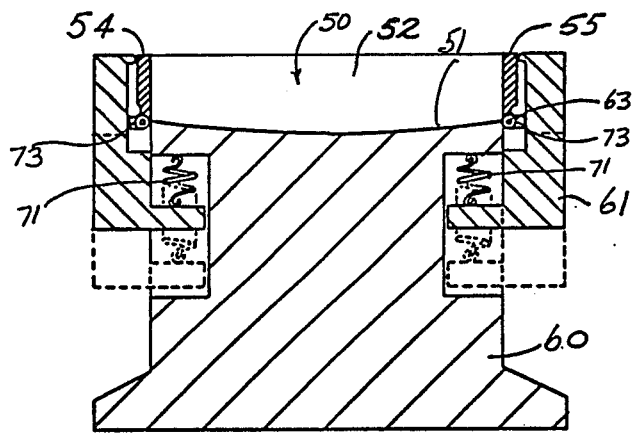
FIG. 4 is cross-sectional view of another embodiment of the invention.
Figure 4A:
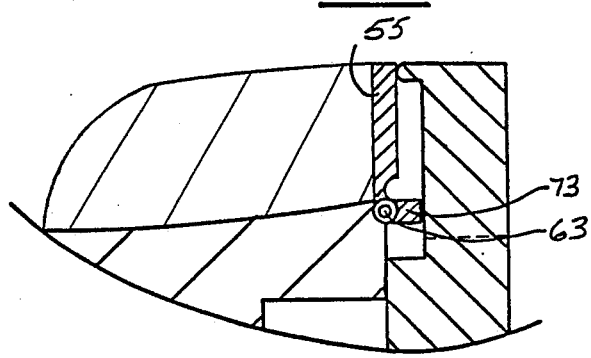

In a further embodiment of the invention shown in FIG. 4, the sliding member 61 which completely surrounds the base 60 and is free to slide thereover, serves to orientate sides 52 and 53, or end members 54 and 55 which are hingedly or pivotally connected to the mold cavity bottom wall 51. In this embodiment, the cavity comprises a mold bottom wall 51 as in the previously described embodiment, but the end walls 54 and 55 and side walls 52 and 53 are all part of the cavity 50 and are attached to the base member 60. The ends 54, 55 are rigidly secured to or formed as part of the bottom wall 51, while the side walls 52,53 are joined to the bottom 51 by means of swingable hinge members 63. When the slidable member 61 is in a raised position as shown in solid line in FIG. 4, the end walls 54,55 and the side walls 52,53 are held in a location so as to complete the mold cavity. As in the previously described embodiment spring means 71 urge the sliding member 61 into the position shown in solid line in FIG. 4. When the slidable member 61 is caused to be lowered lip 72 on the interior surface of sliding member 61 acts on projections 73,73 of the swingable end members 54,55 to swing the end members 54,55 to a lowered position providing access to the bar. Alternately, the end walls 54,55 may be fixed solidly to the base 51 while the side walls 52,53 are free to swing downwardly with the sliding member 61 to again expose the bar of soap.

Obviously, both side walls and both end walls could be hingedly joined to the base so that all four sides could be lowered to remove the bar.

Figure 5:
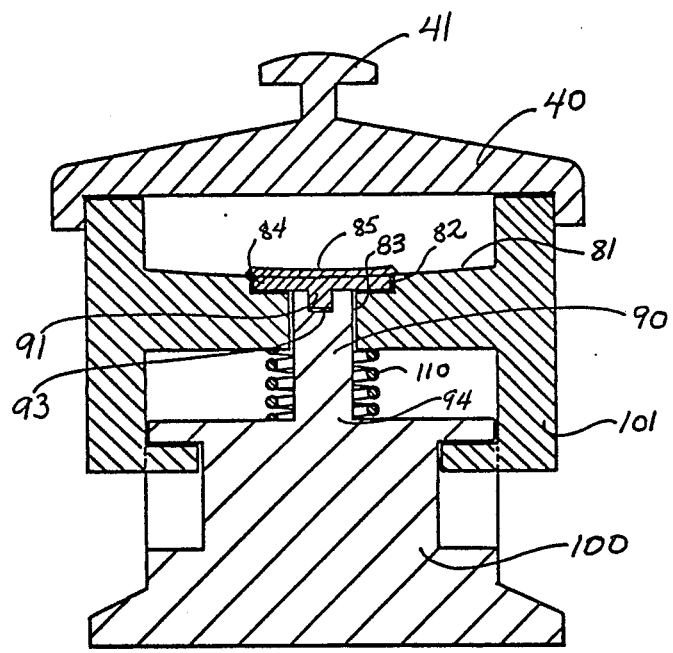
FIG. 5 illustrates a further embodiment of the present invention.

In a further embodiment illustrated in FIG. 5 and referred to hereinbefore the bottom wall 81 includes a recess 82 with a centrally located hole or opening 83. An insert 84 fills the recess 82 and this insert is used to carry the name indicia 85. A post or pedestal 90 is slidably located through the hole 83 in the bottom wall 81 and is removably attached to the underside of the insert 84. It is anticipated that the insert 84 be removably attached to the post 90 by means of a cylindrical protrusion 91 on the underside 92 of the insert which is of a slightly smaller diameter than a cylindrical opening 93 on the top of the post 90. Thus, the insert is held in place by the force fit of the cylindrical protrusion 91 on the insert of the cylindrical opening 93 in the post 90. The insert may be conveniently removed as required. As indicated previously the insert 84 is used to carry the name indicia 85 and therefore by preparing several inserts each having thereon the name of a family member, for example, it is possible to personalize the bars of soap which are molded.

As illustrated n FIG. 5, the post 90 is free to slide through the hole 83 in the bottom of the mold bottom wall 81. The opposite end of the post 94 is fixed to or made part of the base 100. Sliding member 101 in this embodiment includes the cavity bottom wall 81 and both end and side walls. Spring means 110 in the form of a coil spring surrounds the post and urges the mold and insert into a position wherein the cavity is in a closed mode. By forcing the sliding member 10 downwardly, the mold bottom wall 81 and side walls 86,87 and end walls 88,89 are lowered while the insert 84 is held in the raised position by virtue of the fixed post 90. Thus, the insert 84 which forms a portion of the bottom wall 81 causes the bar of soap 95 to be forced up out of the mold.

It is to be understood that the removable insert can be used in conjunction with any of the previously described embodiments, although the attachment method will vary.

In the drawings a cover 40 is illustrated which fits over the apparatus and is retained in place by virtue of a press fit. A handle 41 is provided on the top of the cover 40 to simplify removal. The cover is merely ornamental and it is not essential to the mold cavity.

The apparatus is preferably made of plastic using well known plastic molding techniques. It is contemplated however that the apparatus could be made of porcelain or metal such as aluminum, brass etc. It is intended that the apparatus will be made in a variety of colours in keeping with colour schemes found in the home and in particular the bathroom.

In operation a mixture containing desired soap ingredients is prepared. The mixture may consist entirely of products available commercially, a combination of such products and ingredients chosen by the user to meet specific requirements, such as perfumes, creams etc. or ingredients chosen by the user including remnants of used soap bars. In this way individuals having allergic reaction to commercially available soap products can prepare soap to satisfy their own particular requirements. The mixture will have a viscosity which permits pouring but which will not run through the joints in the mold.

In keeping with the aforementioned personalizing feature of the individual's name or initials is embossed in the name plate insert and the insert is placed in the recess in the mold bottom wall. The soap mixture is then poured into the mold and left to harden or cure.

To remove the soap bar from the molding the sliding member is lowered. Depending on which of the previously described embodiments is in use this action will lower either one or both end walls, one or both side walls, both side and end walls or side, end and bottom walls leaving only the insert carrying the bar. In any case the bar will be readily available for removal.

While the invention has been described in detail with respect to certain embodiments thereof, it will be understood by those skilled in the art that modifications may be made without departing from the essential features thereof.

The embodiments of the invention in which an exclusive property or privilege is claimed are defined as follows:

1. An apparatus for use in molding soap bars comprising a mold cavity having a bottom wall, a pair of opposed side walls and a pair of opposed end walls;
   a base member supporting said mold cavity and having formed integrally therewith said bottom wall and said pair of opposed side walls;
   a sleeve member slidably surrounding said base member, said sleeve member having formed integrally therewith said pair of opposed end walls; and
   spring means between said sleeve and base member attached to said base member and said sleeve member adapted to retain said sleeve member relative to said base member so as to complete said mold cavity and to permit said sleeve member to be lowered with respect to said base member so as to lower said end walls from said mold cavity.

2. An apparatus for use in molding soap bars comprising a mold cavity having a bottom wall, a pair of opposed end walls and a pair of opposed side walls;
   a base member supporting said mold cavity and having formed integrally therewith said bottom wall and said pair of opposed side walls, and hinge means on opposite ends of said bottom wall having hingedly joined thereto said pair of opposed end walls;
   sleeve means slidably surrounding base member; and
   spring means between said sleeve and base member attached to said base member and said sleeve member adapted to retain said sleeve member in a first position surrounding said pair of opposed end walls and said pair of opposed side walls and movable to a second position lower with respect to said end walls and said side walls such that said end walls may be swung away from said mold cavity.

3. An apparatus for use in molding soap bars comprising a mold cavity having a bottom wall, a pair of opposed side walls and a pair of opposed end walls, said bottom wall having a centrally disposed recess and a circular aperture therethrough;

a base member having a vertically disposed post adapted to be slidably received through said aperture;

an insert removably attached to said post and adapted to fit into said recess;

a sleeve having formed integrally therewith said pair of opposed end walls and said pair of opposed side walls and said bottom wall; and spring means between said sleeve member and said base member for retaining said sleeve member in a first position wherein said insert is in said recess and movable to a second lowered position wherein said bottom wall, said pair of opposed side walls and said pair of opposed end walls are lowered with respect to said insert.

* * * * *